United States Patent
Li et al.

(10) Patent No.: US 11,025,417 B2
(45) Date of Patent: Jun. 1, 2021

(54) CROSS-BLOCKCHAIN DATA ACCESS METHOD, APPARATUS AND SYSTEM, AND COMPUTER READABLE MEDIUM

(71) Applicant: BAIDU ONLINE NETWORK TECHNOLOGY (BEIJING) CO., LTD., Beijing (CN)

(72) Inventors: Feng Li, Beijing (CN); Wei Xiao, Beijing (CN); Yunpeng Wang, Beijing (CN); Zhiyuan Yu, Beijing (CN); Wenchao Wang, Beijing (CN); Shihui Zhou, Beijing (CN); Xianghui Zhao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 230 days.

(21) Appl. No.: 16/192,642

(22) Filed: Nov. 15, 2018

(65) Prior Publication Data

US 2019/0238327 A1    Aug. 1, 2019

(30) Foreign Application Priority Data

Jan. 30, 2018    (CN) .......................... 201810090065.8

(51) Int. Cl.
*H04L 9/08*    (2006.01)
*H04L 9/32*    (2006.01)
(Continued)

(52) U.S. Cl.
CPC ........ *H04L 9/0861* (2013.01); *G06F 16/1824* (2019.01); *G06F 21/44* (2013.01); *H04L 9/3213* (2013.01); *G06F 2221/2137* (2013.01)

(58) Field of Classification Search
CPC ................. G06F 21/44; G06F 16/1824; G06F 2221/2137; G06F 21/6218; G06F 21/64;
(Continued)

(56) References Cited

U.S. PATENT DOCUMENTS 10,735,193 B1 *   8/2020  Knas ..................... H04L 9/0861
2017/0337534 A1  11/2017  Goeringer et al.
(Continued)

FOREIGN PATENT DOCUMENTS

CN    106445711 A    2/2017
CN    106447309 A    2/2017
(Continued)

OTHER PUBLICATIONS

Notification to Grant Patent Right for Invention from CN app. No. 201810090065.8, dated Mar. 6, 2019, with English translation from Global Dossier.

*Primary Examiner* — Kevin Bechtel
*Assistant Examiner* — Hamid Talaminaei
(74) *Attorney, Agent, or Firm* — Ladas & Parry, LLP

(57) ABSTRACT

The present disclosure provides a cross-blockchain data access method, apparatus and system, and a computer readable medium. The method comprises: sending an authorizing blockchain apparatus a block data request carrying a requesting blockchain apparatus identifier and authorization information, so that the authorizing blockchain apparatus verifies whether the authorization information corresponding to locally-stored requesting blockchain apparatus identifier is matched with the authorization information in the block data request; receiving block data sent by the authorizing blockchain apparatus and corresponding to the block data request, the block data being sent after the authorizing blockchain apparatus verifies that the authorization information corresponding to locally-stored requesting block- (Continued)

chain apparatus identifier is matched with the authorization information in the block data request. According to the present disclosure, through an authorization mechanism, namely, the authorizing blockchain apparatus's authorization for the requesting blockchain apparatus, the requesting blockchain apparatus may be enabled to access the block data of the authorizing blockchain apparatus according to the authorization information, thereby finally achieving cross-blockchain data access. The cross-blockchain data access according to the present disclosure does not require manual participation and exhibits a higher access efficiency.

7 Claims, 5 Drawing Sheets

(51) Int. Cl.
*G06F 21/44* (2013.01)
*G06F 16/182* (2019.01)

(58) Field of Classification Search
CPC . H04L 9/0861; H04L 9/3213; H04L 2209/38; H04L 9/3239; H04L 9/3247; H04L 63/10
See application file for complete search history.

(56) References Cited

U.S. PATENT DOCUMENTS

| | | | |
|---|---|---|---|
| 2018/0005186 A1 | 1/2018 | Hunn | |
| 2019/0036682 A1* | 1/2019 | Qiu | H04L 9/0637 |
| 2019/0172026 A1* | 6/2019 | Vessenes | H04L 9/3247 |
| 2019/0188701 A1* | 6/2019 | Parsons | H04L 9/3239 |

FOREIGN PATENT DOCUMENTS

| | | |
|---|---|---|
| CN | 106899698 A | 6/2017 |
| CN | 106960388 A | 7/2017 |
| CN | 107396360 A | 11/2017 |
| CN | 107566117 A | 1/2018 |

* cited by examiner

CROSS-BLOCKCHAIN DATA ACCESS METHOD, APPARATUS AND SYSTEM, AND COMPUTER READABLE MEDIUM

The present application claims the priority to Chinese Patent Application No. 201810090065.8, filed on Jan. 30, 2018, with the title of "Cross-blockchain data access method, apparatus and system, and computer readable medium". The disclosure of the above applications is incorporated herein by reference in its entirety.

FIELD OF THE DISCLOSURE

The present disclosure relates to the technical field of computer application, and particularly to a cross-blockchain data access method, apparatus and system, and a computer readable medium.

BACKGROUND OF THE DISCLOSURE

As blockchain technology is understood and recognized more and more widely, how to achieve inter-blockchain data exchange and transfer and communicate isolated blockchains by a cross-chain technology to form a larger pan-blockchain network is of more and more actual significance.

For example, there is one independent supply chain blockchain and one independent goods sales blockchain, and a whole life cycle from production to sales of goods can be covered only by combining the two blockchains together. If data of the two blockchains are made communicated by using a cross-chain technology to achieve sharing and exchange, it is possible to achieve trace-back of the whole life cycle of goods, and achieve data mining of the whole life cycle, which is of very important reference value and guidance significance for displaying production.

Current blockchains are independent from one another, data in each blockchain is only for internal sharing, and exchange and sharing of data between different blockchains requires manual participation. This causes cross-blockchain data access efficiency lower.

SUMMARY OF THE DISCLOSURE

The present disclosure provides a cross-blockchain data access method, apparatus and system, and a computer readable medium, to improve a cross-blockchain data access efficiency.

The present disclosure provides a cross-blockchain data access method, the method comprising:

sending an authorizing blockchain apparatus a block data request carrying a requesting blockchain apparatus identifier and authorization information, so that the authorizing blockchain apparatus verifies whether the authorization information corresponding to locally-stored requesting blockchain apparatus identifier is matched with the authorization information in the block data request;

receiving block data sent by the authorizing blockchain apparatus and corresponding to the block data request, the block data being sent after the authorizing blockchain apparatus verifies that the authorization information corresponding to locally-stored requesting blockchain apparatus identifier is matched with the authorization information in the block data request.

Further optionally, in the abovementioned method, before sending an authorizing blockchain apparatus a block data request carrying a requesting blockchain apparatus identifier and authorization information, the method further comprises:

sending the authorizing blockchain apparatus an authorization request carrying the requesting blockchain apparatus identifier so that the authorizing blockchain apparatus, after verifying legality of the authorization request, determines whether to agree the authorization request of the authorizing blockchain apparatus;

receiving and storing the authorization information sent by the authorizing blockchain apparatus; the authorization information is configured and sent for the requesting blockchain apparatus after the authorizing blockchain apparatus determines to agree the authorization request of the authorizing blockchain apparatus.

Further optionally, in the abovementioned method, the authorization information comprises an authorization token and a validity period of authorization. The authorization token is a token character string after a private key of a blockchain node authorized by the authorizing blockchain apparatus performing authorization is encrypted.

The present disclosure provides a cross-blockchain data access method, the method comprising:

receiving a block data request sent by a requesting blockchain apparatus and carrying a requesting blockchain apparatus identifier and authorization information;

obtaining a corresponding locally-stored authorization information according to the requesting blockchain apparatus identifier;

verifying whether the corresponding locally-stored authorization information is matched with authorization information in the block data request;

sending block data corresponding to the block data request, to the requesting blockchain apparatus if the corresponding locally-stored authorization information is matched with authorization information.

Further optionally, in the abovementioned method, before receiving a block data request sent by a requesting blockchain apparatus and carrying a requesting blockchain apparatus identifier and authorization information, the method further comprises:

receiving an authorization request sent by the requesting blockchain apparatus and carrying the requesting blockchain apparatus identifier;

verifying whether the authorization request is legal;

if the authorization request is legal, determining to agree the authorization request of the requesting blockchain apparatus through a consensus mechanism.

Further optionally, in the abovementioned method, after determining to agree the authorization request of the requesting blockchain apparatus through a consensus mechanism, the method further comprises:

configuring the authorization information for the requesting blockchain apparatus;

storing a correspondence relationship between the requesting blockchain apparatus identifier and the authorization information;

sending the authorization information to the requesting blockchain apparatus.

Further optionally, in the abovementioned method, the configuring the authorization information for the requesting blockchain apparatus specifically comprises:

regarding a token character string obtained after encrypting a private key of a blockchain node authorized by performing authorization, as an authorization token;

setting a corresponding authorization validity period.

Further optionally, in the abovementioned method, the verifying whether the authorization request is legal specifically comprises:

verifying whether a format of the authorization request is correct;

verifying whether the requesting blockchain apparatus identifier in the authorization request is legal;

verifying whether the type of the requesting blockchain apparatus identifier in the authorization request is legal;

verifying whether a signature of the authorization request is legal;

verifying whether a protocol version corresponding to the authorization request is legal; and/or verifying whether content of the authorization request is legal.

Further optionally, in the abovementioned apparatus, the determining to agree the authorization request of the requesting blockchain apparatus through a consensus mechanism specifically comprises:

sending an authorization proposal request to any target blockchain node, so that the target blockchain node sends an authorization proposal request carrying the requesting blockchain apparatus identifier to all other blockchain nodes, and all blockchain nodes perform consensus scoring for the requesting blockchain apparatus to obtain a final score of the requesting blockchain apparatus;

detecting whether the final score is larger than a preset score threshold;

if yes, determining to agree the authorization request of the requesting blockchain apparatus.

Further optionally, the abovementioned method, the method comprises:

when a data block is newly added, verifying whether the already-existing authorization information is within a validity period;

adding the authorization information corresponding to the requesting blockchain apparatus identifier to the newly-added data block if the already-existing authorization information is within the validity period.

The present disclosure provides a blockchain apparatus, comprising:

a sending module configured to send an authorizing blockchain apparatus a block data request carrying a requesting blockchain apparatus identifier and authorization information, so that the authorizing blockchain apparatus verifies whether the authorization information corresponding to locally-stored requesting blockchain apparatus identifier is matched with the authorization information in the block data request;

a receiving module configured to receive block data sent by the authorizing blockchain apparatus and corresponding to the block data request, the block data being sent after the authorizing blockchain apparatus verifies that the authorization information corresponding to locally-stored requesting blockchain apparatus identifier is matched with the authorization information in the block data request.

Further optionally, in the blockchain apparatus, the sending module is further configured to send the authorizing blockchain apparatus an authorization request carrying the requesting blockchain apparatus identifier so that the authorizing blockchain apparatus, after verifying legality of the authorization request, determines whether to agree the authorization request of the authorizing blockchain apparatus;

the receiving module is further configured to receive and store the authorization information sent by the authorizing blockchain apparatus, the authorization information is configured and sent for the requesting blockchain apparatus after the authorizing blockchain apparatus determines to agree the authorization request of the authorizing blockchain apparatus.

Further optionally, in the abovementioned apparatus, the authorization information comprises an authorization token and a validity period of authorization. The authorization token is a token character string after a private key of a blockchain node authorized by the authorizing blockchain apparatus performing authorization is encrypted.

The present disclosure provides a blockchain apparatus, comprising:

a receiving module configured to receive a block data request sent by a requesting blockchain apparatus and carrying a requesting blockchain apparatus identifier and authorization information;

an obtaining module configured to obtain a corresponding locally-stored authorization information according, to the requesting blockchain apparatus identifier;

a verifying module configured to verify whether the corresponding locally-stored authorization information is matched with authorization information in the block data request;

a sending module configured to send block data corresponding to the block data request, to the requesting blockchain apparatus if the corresponding locally-stored authorization information is matched with authorization information.

Further optionally, in the abovementioned apparatus further comprises a determining module;

the receiving module is further configured to receive an authorization request sent by the requesting blockchain apparatus and carrying the requesting blockchain apparatus identifier;

the verifying module is further configured to verify whether the authorization request is legal;

the determining module is configured to, if the authorization request is legal, determine to agree the authorization request of the requesting blockchain apparatus through a consensus mechanism.

Further optionally, the blockchain apparatus further comprises a configuring module and a storing module;

the configuring module is configured to configure authorization information for the requesting blockchain apparatus;

the storing module is configured to store a correspondence relationship between the requesting blockchain apparatus identifier and the authorization information;

the sending module is further configured to send the authorization information to the requesting blockchain apparatus.

Further optionally, in the abovementioned apparatus, the configuring module is specifically configured to:

regard a token character string obtained after encrypting a private key of a blockchain node authorized by performing authorization, as an authorization token;

set a corresponding authorization validity period.

Further optionally, in the abovementioned apparatus, the verifying module is specifically configured to:

verify whether a format of the authorization request is correct;

verify whether the requesting blockchain apparatus identifier in the authorization request is legal;

verify whether the type of the requesting, blockchain apparatus identifier in the authorization request is legal;

verify whether a signature of the authorization request is legal;

verify whether a protocol version corresponding to the authorization request is legal; and/or verify whether content of the authorization request is legal.

Further optionally, in the abovementioned apparatus, the determining module is specifically configured to:

send an authorization proposal request to any target blockchain node, so that the target blockchain node sends an authorization proposal request carrying the requesting blockchain apparatus identifier to all other blockchain nodes, and all blockchain nodes perform consensus scoring, for the requesting, blockchain apparatus to obtain a final score of the requesting blockchain apparatus;

detect whether the final score is larger than a preset score threshold;

if yes, determine to agree the authorization request of the requesting blockchain apparatus.

Further optionally, the abovementioned apparatus further comprises an additional processing module;

the verifying module is specifically configured to, when a data block is newly added, verify whether the already-existing authorization information is within a validity period;

the additional processing module is configured to add the authorization information corresponding to the requesting blockchain apparatus identifier to the newly-added data block if the already-existing authorization information is within the validity period.

The present disclosure provides a cross-blockchain data access system, the system comprising: a first blockchain apparatus and a second blockchain apparatus which are communicatively coupled, the first blockchain apparatus employs the aforesaid blockchain apparatus, and the second blockchain apparatus employs the abovementioned blockchain apparatus.

The present disclosure further provides a computer device, comprising:

one or more processors.

a storage for storing one or more programs, the one or more programs, when executed by said one or more processors, enable said one or more processors to implement the above-mentioned cross-blockchain data access method.

The present disclosure further provides a computer readable medium on which a computer program is stored, the program, when executed by a processor, implementing the above-mentioned cross-blockchain data access method.

According to the cross-blockchain data access method, apparatus, system and computer readable medium of the present disclosure, it is feasible to send an authorizing blockchain apparatus a block data request carrying a requesting blockchain apparatus identifier and authorization information, so that the authorizing blockchain apparatus verifies whether the authorization information corresponding to locally-stored requesting blockchain apparatus identifier is matched with the authorization information in the block data request; receive block data sent by the authorizing blockchain apparatus and corresponding to the block data request, the block data being sent after the authorizing blockchain apparatus verifies that the authorization information corresponding to locally-stored requesting blockchain apparatus identifier is matched with the authorization information in the block data request. According to the technical solution of the present embodiment, through an authorization mechanism, namely, the authorizing blockchain apparatus's authorization for the requesting blockchain apparatus, the requesting blockchain apparatus may be enabled to access the block data of the authorizing blockchain apparatus according to the authorization information, thereby finally achieving cross-blockchain data access. The cross-blockchain data access according to the present disclosure does not, require manual participation and exhibits a higher access efficiency.

DETAILED DESCRIPTION OF PREFERRED EMBODIMENTS

The present disclosure will be described in detail with reference to figures and specific embodiments to make objectives, technical solutions and advantages of the present disclosure more apparent.

Figure 1:
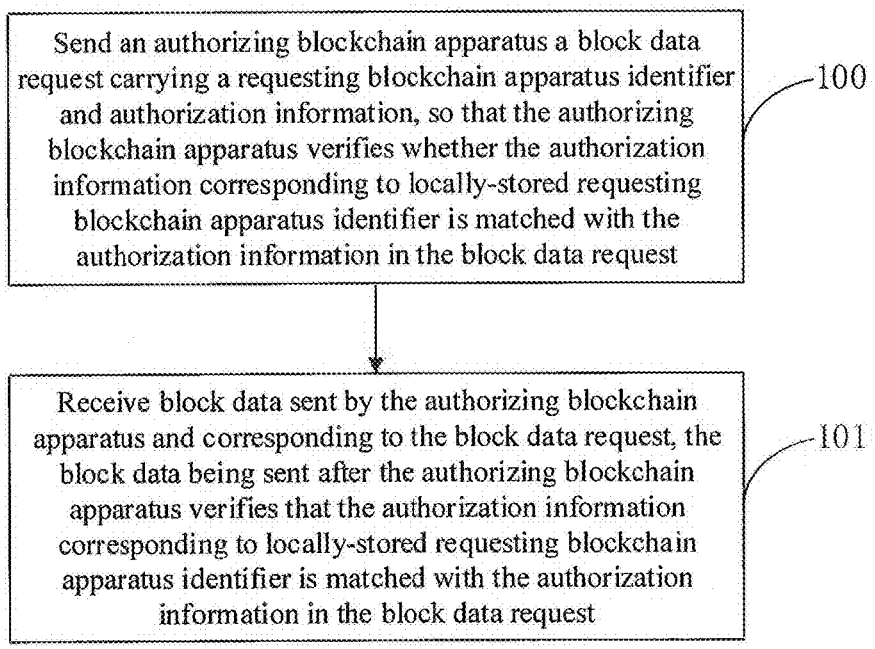
FIG. 1 is a flow chart of Embodiment 1 of a cross-blockchain data access method according to the present disclosure.

FIG. 1 is a flow chart of Embodiment 1 of a cross-blockchain data access method according to the present disclosure. As shown in FIG. 1, the cross-blockchain data access method according to the present embodiment may specifically comprise the following steps:

100: sending an authorizing blockchain apparatus a block data request carrying a requesting blockchain apparatus identifier and authorization information, so that the authorizing blockchain apparatus verifies whether the authorization information corresponding to locally-stored requesting blockchain apparatus identifier is matched with the authorization information in the block data request;

101: receiving block data sent by the authorizing blockchain apparatus and corresponding to the block data request, the block data being sent after the authorizing blockchain apparatus verifies that the authorization information corresponding to locally-stored requesting blockchain apparatus identifier is matched with the authorization information in the block data request.

The cross-blockchain data access method according to the present embodiment takes two independent blockchain apparatuses as an example. For example, a subject for executing the cross-blockchain data access method according to the present embodiment may be a blockchain apparatus for sending a request, which may be briefly called a requesting blockchain apparatus, whereas the other side is an authorizing blockchain apparatus. The requesting blockchain apparatus requests the authorizing blockchain apparatus for authorization to achieve access to block data in the authorizing blockchain apparatus by obtaining authorization, thereby achieving the cross-blockchain data access.

The requesting blockchain apparatus and authorizing blockchain apparatus according to the present embodiment include a plurality of blockchain nodes located at a bottom layer of the blockchain and used to store block data, as well as an application of the blockchain encapsulated over the blockchain nodes. Specifically, an application of one blockchain may be encapsulated over each blockchain node, or an application of one blockchain is jointly encapsulated over a plurality of blockchain nodes. The block data request in the present embodiment may specifically be sent from the blockchain nodes in the requesting blockchain apparatus to blockchain nodes in the authorizing blockchain apparatus. Since information of the plurality of blockchain nodes in the same blockchain apparatus is shared, it may be sent from any blockchain node in the requesting blockchain apparatus to any blockchain node in the authorizing blockchain apparatus. Or in practical application, the requesting blockchain apparatus may also select from the plurality of blockchain nodes a blockchain node which is purposefully used to request for the block data of the authorizing blockchain apparatus. Correspondingly, the authorizing blockchain apparatus may also select from the plurality of blockchain nodes a blockchain node which is purposefully used to receive the data access.

In the present embodiment, after the requesting blockchain apparatus sends the authorizing blockchain apparatus a block data request carrying the requesting blockchain apparatus identifier and authorization information, the authorizing blockchain apparatus may verify whether authorization information corresponding to locally-stored requesting blockchain apparatus identifier is matched with the authorization information in the block data request, and if matched, send the block data corresponding to the block data request to the requesting blockchain apparatus. Correspondingly, the requesting blockchain apparatus receives the block data corresponding to the block data request sent by the authorizing blockchain apparatus.

Further optionally, before step 100 "sending an authorizing blockchain apparatus a block data request carrying a requesting blockchain apparatus identifier and authorization information" in the technical solution of the present embodiment, the method may further comprise the following steps:

(a1) sending the authorizing blockchain apparatus an authorization request carrying the requesting blockchain apparatus identifier so that the authorizing blockchain apparatus, after verifying legality of the authorization request, determines whether to agree the authorization request of the authorizing blockchain apparatus;

(b1) receiving and storing the authorization information sent by the authorizing blockchain apparatus, the authorization information is configured and sent for the requesting blockchain apparatus after the authorizing blockchain apparatus determines to agree the authorization request of the authorizing blockchain apparatus.

All network communications between blockchains in the present embodiments employ an encrypted safe communication manner based on the Transport Layer Security (TLS) protocol, for example Hyper Text Transfer Protocol (HTTP)+tls, or grps. The request and return both include a corresponding signature.

For example, all request may employ the following format:

```
{
    sourceId: in inter-blockchain access, if blockchain A sends a request, namely, an id of blockchain A, to blockchain B;
    sourceType: indicating a source type which is already mutually agreed, for example, a participating party node and a regulatory authority;
    nonce: a 32-bit random character string, preventing the signature from being predicted;
    sign: digital signature specifically employing sha256withrsa or ecc to verify the source: raw data: after sorting according to parameters, concatenate to form k1=v1&k2=v2, as signature input;
    version:"1.0.0", identifying a protocol version;
    content: specific contents as requested
}
``` wherein the sourceType in the request may identify that the source of sending a request is a type such as an application, device, platform or system, and the preset type is duly predefined at both ends of communication. The content may record the requested specific content, thereby determining information included in the request and what request the request is specifically, correspondingly, return of all responses may employ the following format:

```
{
    "code": return a state code, mutually agree;
    "message": "success", return a message;
    "nonce": "JO391BMK3i35VsfzQoM0SblETNkj9Pmr",
    a 32-bit random character string, preventing the signature from being predicted;
    "sign": "AhDsf0kpd2/HS1W8HETc8btJUxRPyng+ ...... g==",
    digital signature specifically employing sha256withrsa or ecc to verify the source: raw data: after sorting according to parameters, concatenate to form k1=v1&k2=v2, as signature input;
    "result": specific content returned;
}
```

In addition, the authorization request may further comprise a timestamp when the authorization request is sent, so that the authorizing blockchain apparatus verifies whether the authorization request is an authorization request within a time cycle to be processed according to the timestamp when the authorization request is sent and a current timestamp. As such, it is possible to filter away the case in which the authorization request is received by the authorizing blockchain apparatus after a long time period after it is sent due to factors such as network time delay. According to the solution, at this time the authorizing blockchain apparatus verifies that the authorization request is not an authorization request within a time cycle to be processed according to the timestamp when the authorization request is sent and a current timestamp, and the authorization request may be discarded directly.

For example, the authorization request of the present embodiment may be sent in the above format of request, wherein the requesting blockchain apparatus identifier and authorization information may be carried in "content". In addition, the authorization information of the present embodiment may be carried in the "result" returned by the response. For example, the authorization information of the present embodiment may comprise an authorization token and a validity period of authorization. The authorization token is a token character string after a private key of a blockchain node authorized by the authorizing blockchain apparatus performing authorization is encrypted. The validity period of authorization of the present embodiment may be a preset time period starting from the moment of authorization, for example, may be one month, two months or other time periods.

According to the cross-blockchain data access method of the present embodiment, it is possible to send an authorizing blockchain apparatus a block data request carrying a requesting blockchain apparatus identifier and authorization information, so that the authorizing blockchain apparatus verifies whether the authorization information corresponding to locally-stored requesting blockchain apparatus identifier is matched with the authorization information in the block data request; receive block data sent by the authorizing blockchain apparatus and corresponding to the block data request, the block data being sent after the authorizing blockchain apparatus verifies that the authorization information corresponding to locally-stored requesting blockchain apparatus identifier is matched with the authorization information in the block data request. According to the technical solution of the present embodiment, through an authorization mechanism, namely, the authorizing blockchain apparatus's authorization for the requesting blockchain apparatus, the requesting blockchain apparatus may access the block data of the authorizing blockchain apparatus according to the authorization information, thereby finally achieving cross-blockchain data access. The cross-blockchain data access according to the present embodiment does not require manual participation and exhibits a higher access efficiency.

Figure 2:
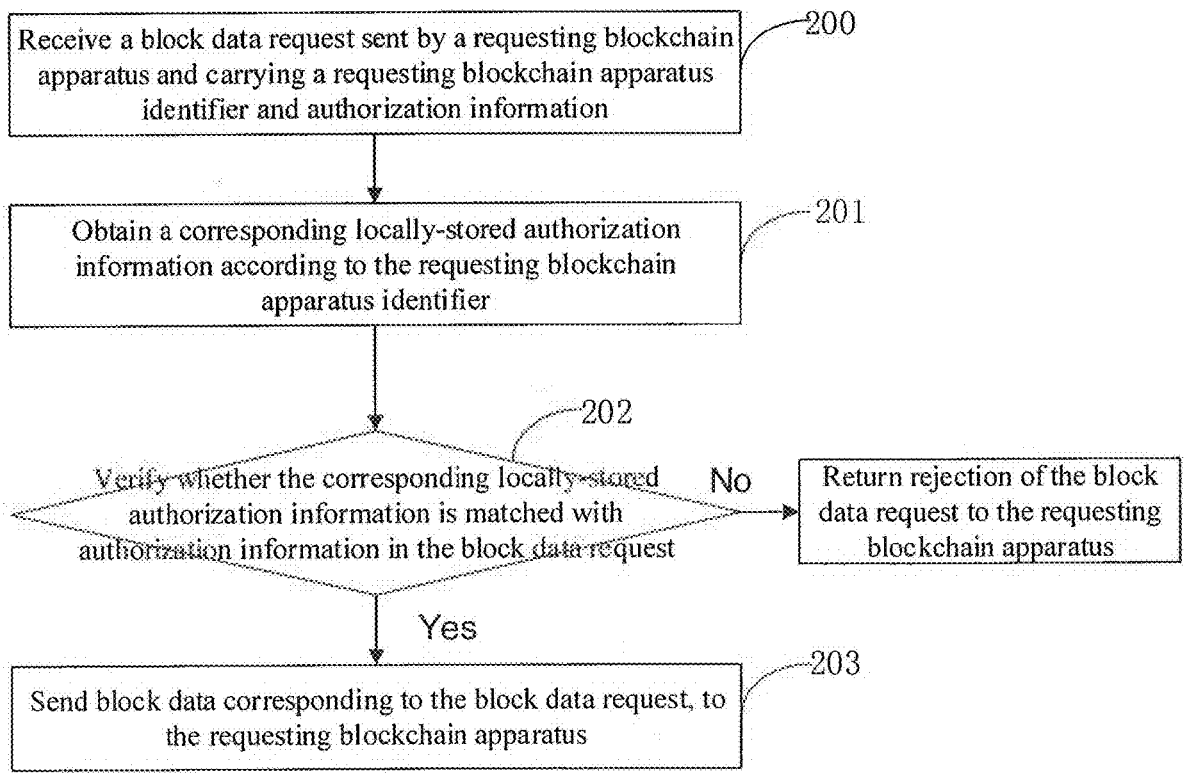
FIG. 2 is a flow chart of Embodiment 2 of a cross-blockchain data access method according to the present disclosure.

FIG. 2 is a flow chart of Embodiment 2 of a cross-blockchain data access method according to the present disclosure. As shown in FIG. 2, the cross-blockchain data access method according to the present embodiment may specifically comprise the following steps:

200: receiving a block data request sent by a requesting blockchain apparatus and carrying a requesting blockchain apparatus identifier and authorization information;

201: obtaining a corresponding locally-stored authorization information according to the requesting blockchain apparatus identifier;

202: verifying whether the corresponding locally-stored authorization information is matched with authorization information in the block data request; if matched, performing step 203; if not matched, returning rejection of the block data request to the requesting blockchain apparatus;

For example, the rejection of the block data request may be returned in the abovementioned response returning manner. Correspondingly, it is possible to employ a preset return state code in a message of the response return to represent rejecting the bock data request.

203 Sending block data corresponding to the block data request, to the requesting blockchain apparatus.

Furthermore, before the step 200 "receiving a block data request sent by a requesting blockchain apparatus and carrying a requesting blockchain apparatus identifier and authorization information" in the present embodiment, the method may further comprises the following steps:

(a2) receiving the authorization request sent by the requesting blockchain apparatus and carrying the requesting blockchain apparatus identifier;

(b2) verifying whether the authorization request is legal; if legal, performing step (c2); if not legal, returning rejection of the authorization request to the requesting blockchain apparatus;

wherein the rejection of the authorization request may be returned in the abovementioned response returning manner. Correspondingly, it is possible to employ a preset return state code in a message of the response return to represent rejecting the authorization request.

Specifically, the step (b2) may specifically be performed by a blockchain application of the authorizing blockchain apparatus. In addition, in practical application, the authorization request includes the type sourceType of the requesting blockchain apparatus, a protocol version, signature and specific content of the request, in addition to the identifier of the requesting blockchain apparatus sending the request, namely, sourceID. Hence, the step (b2), upon implementation, may execute at least one of the following verifications:

(1) verifying whether a format of the authorization request is correct;

In the present embodiment, the format of all requests may employ the format defined above. If the format is incorrect, it is believed that the authorization request is illegal.

(2) verifying whether the requesting blockchain apparatus identifier in the authorization request is legal;

(3) verifying whether the type of the requesting blockchain apparatus identifier in the authorization request is legal;

In the present embodiment, the requesting blockchain apparatus identifier may be used to identify the whole blockchain. For example, to facilitate managing all blockchain apparatuses, it is possible to make statistics of basic information of all blockchain apparatus in advance, for example, the blockchain apparatus identifier sourceID, the type of the stored block data, and the type sourceType of the blockchain apparatus that may be supported, and store the basic information in an information library of the blockchain apparatus. As such, a blockchain application in the authorizing blockchain apparatus may obtain, from the information library of the blockchain apparatus, all blockchain apparatus identifier sourceID and the type sourceType of all blockchain apparatuses that may be supported, so as to determine whether the sourceID and sourceType in the authorization request are legal.

(4) verifying whether a signature of the authorization request is legal:

A specific manner of verifying legality of the signature may employ a current relevant signature verification manner, and will not be detailed here any more.

(5) verifying whether a protocol version corresponding to the authorization request is legal; and/or In the present embodiment, the blockchain application of the authorizing blockchain apparatus may store the highest version that can be supported. If the protocol version corresponding to the authorization request is lower than the highest version corresponding to the authorizing blockchain apparatus, since the high version is compatible to the low version, it is believed that the protocol version is legal at this time. If the protocol version corresponding to the authorization request is higher than the highest version corresponding to the authorizing blockchain apparatus, since the blockchain application of the authorizing blockchain apparatus cannot process the authorization request of the protocol version, it may be believed that the protocol version is illegal.

(6) verifying whether the content of the authorization request is legal.

Specifically, in the present embodiment, it is possible to verify whether specific content in the content in the authorization request is legal. For example, both parties of communication pre-define the number of parameters of each request, parameter formats and business types of the parameters. As such, when whether the specific content in content in the authorization request is legal is verified, it is possible to pre-determine that the current request is the authorization request, and then acquire the number of parameters, a format of each parameter and a corresponding business type of the parameter needed in the authorization request, and then verify whether the specific content in content is legal. For example, if parameters may include information about a sending moment, it is possible to verify whether the information about the sending moment in the content is prior to the current moment, and if yes, determine it is legal, or if no, determine that it is illegal. Again for example, if it is required that the business type of the parameter is a client, and if it is verified that the business type in the content is a server, it is believed that the content of the authorization request is legal. The above is only an implementation mode for verifying that the content of the authorization request is legal. In practical application, it is possible to verify whether the content of the authorization request is legal in other manners, which will not be detailed any more here.

It is feasible to verify whether the authorization request is legal in at least one of the above manners, and if legal, employ the above response returning manner to return a response of successful authorization, or if not legal, employ the above response returning manner to return a response of rejecting authorization. Correspondingly, a code returned by each response may represent whether the response is successful or unsuccessful. If the response is unsuccessful, different return state codes may further identify reasons for failure.

(c2) through a consensus mechanism, determining whether to agree the authorization request of the requesting blockchain apparatus; performing subsequent steps in the case of agreeing; otherwise, rejecting the authorization request of the requesting blockchain apparatus, and correspondingly, retuning different authorization requests. In the return of response at this time, a corresponding state code is returned according to pre-agreed reasons for disagree. The specific content of the returned response may be recorded in the result.

If the verification of legality passes, the authorizing blockchain apparatus determines to agree the authorization request of the requesting blockchain apparatus through the consensus mechanism. For example, the authorizing blockchain apparatus may specifically determine to agree the authorization request of the requesting blockchain apparatus through the consensus mechanism in the following manner: the blockchain application in the authorizing blockchain apparatus may select any blockchain node in the blockchain apparatus as a target blockchain node, send a registration propose request to the target blockchain node, the target blockchain node sends an authorization propose request carrying the requesting blockchain apparatus identifier to all other blockchain nodes in the authorizing blockchain apparatus, all blockchain nodes of the authorizing, blockchain apparatus performs consensus scoring for the requesting blockchain apparatus to obtain a final score of the requesting blockchain apparatus; for example, the information library of the blockchain apparatus may store various attribute information in each blockchain apparatus such as business type, field, number of included blockchain nodes, and size of the stored block data, and correspondingly, each blockchain node of the authorizing blockchain apparatus may score for the blockchain apparatus according to at least one attribute information of the requesting blockchain apparatus. Then, the target blockchain node scores a final score for the requesting blockchain apparatus according to the scoring situation of each blockchain node in the authorizing blockchain apparatus. For example, it is possible to take an average value of scores of all blockchain nodes in the authorizing blockchain apparatus, or use other mathematic methods to calculate an optimal value as the final score of the requesting blockchain apparatus.

Then, the blockchain application in the authorizing blockchain apparatus detects whether the final score is larger than a preset score threshold; if yes, the blockchain application in the authorizing blockchain apparatus determines to agree the authorization request of the requesting blockchain apparatus, wherein the preset score threshold may be selected according to practical experience.

Or in practical application, it is further possible to allow the content of the authorization request to carry parameter information of the requesting blockchain apparatus, and then the plurality of blockchain nodes of the authorizing blockchain apparatus determine whether to agree the authorization request of the requesting blockchain apparatus through the consensus mechanism directly according to the parameter information carried in the content. In addition, the consensus mechanism is an implementation mechanism in which the plurality of blockchain nodes of the authorizing blockchain apparatus jointly score and vote. In practical application, implemented may further be achieved in other manners other than the above manners, which will not be detailed one by one.

In the above manner, the authorizing blockchain apparatus may verify the authorization request of the requesting blockchain apparatus, and notify the requesting blockchain apparatus after registration is agreed. For example, the above step (c2) of the above embodiment may further comprise the following steps, after determining to agree the authorization request of the requesting blockchain apparatus through a consensus mechanism:

(a3) configuring authorization information for the requesting blockchain apparatus;

For example, the configuring authorization information for the requesting blockchain apparatus in the present embodiment specifically comprises: encrypting a private key of a blockchain node authorized by performing authorization, to obtain a token string as an authorization token; setting a corresponding validity period of authorization. The validity period of authorization in the present embodiment may be pre-selected according to practical experience, for example, may be one month, two months or other preset time period. That is, the authorization information of the present embodiment comprises two parameters: authorization token and the validity period of authorization.

(b3) storing a correspondence relationship between the requesting blockchain apparatus identifier and the authorization information;

(c3) sending the authorization information to the requesting blockchain apparatus.

Since the authorization information is allocated to the requesting blockchain apparatus, the authorizing blockchain apparatus, after completion of configuration of the authorization information, may further locally store the correspondence relationship between the requesting blockchain apparatus identifier and the authorization information, and return it to the requesting blockchain apparatus. As such, the authorizing blockchain apparatus may subsequently perform access to the block data according to the authorization information.

Data stored in blockchain nodes in any blockchain apparatus of the authorizing blockchain apparatus is stored in a manner of blocks, and data blocks in the blockchain nodes will increase constantly as time increases. Further optionally, when data blocks increase newly, the newly-increased data blocks may also obtain already-authorized authorization information since data of blockchain nodes is shared. For example, this may specifically comprise the following steps: when data blocks increase newly, verify whether already-existing authorization information is within the validity period; for example, it is possible to obtain by reading all authorization information in a preceding data block; and check whether the validity period of each authorization information is earlier than the current moment; if not, this indicates that the current authorization information is still within the validity period and at this time, the authorization information is added in the newly-increased data block, so that the newly-increased data block may process data access of the blockchain apparatus corresponding to the authorization information according to the authorization information. Otherwise, if the validity period of the authorization information is earlier than the current moment, this indicates that the authorization information already expires; the expired authorization information is not written into the newly-increased data block, and meanwhile it is possible to record release of the authorization information in blockchain nodes in the corresponding blockchain apparatus. For example, it is specifically possible to record the release of the authorization information in a data block of the blockchain node. Since data of blockchain nodes are shared, the release of the authorization information may be spread to other blockchain nodes of the blockchain apparatus. As such, when subsequently there are requesting blockchain apparatuses which correspond to the release of the authorization information and request for data, it is possible to refuse to provide block data. This release manner may be a manner of automatically releasing the authorization information.

In addition, in practical application, it is possible to detect whether each authorization information has a corresponding record of releasing authorization information, and if yes, this indicates that the authorization information already expired. Other processing is similar and will not be detailed any more here.

Optionally, in the present embodiment, it is possible to release authorization in a manner of actively releasing authorization. For example, the requesting blockchain apparatus may send an authorization-releasing request carrying the requesting blockchain apparatus identifier to the authorizing blockchain apparatus, and the authorization-releasing request is sent in the above request format. Then, after receiving the authorization-releasing request, the authorizing blockchain apparatus verifies whether the authorization-releasing request is legal, and if legal, determines that the release is valid, and writes authorization-releasing information corresponding to the requesting blockchain apparatus identifier into the authorizing blockchain apparatus. The authorizing blockchain apparatus returns a response message of successful release to the requesting blockchain apparatus. The corresponding response message of successful release may employ the abovementioned response returning manner. When new data blocks are written into the blockchain nodes of the authorizing blockchain apparatus subsequently, if it is found that the requesting blockchain apparatus not only corresponds to presence of authorization information but also to existence of the authorization-releasing information, whereupon authorization information corresponding to the requesting blockchain apparatus identifier is no longer added into new data blocks.

Again, optionally, after step 200 "receiving a block data request sent by a requesting blockchain apparatus and carrying a requesting blockchain apparatus identifier and authorization information" and before step 201 "obtaining a corresponding locally-stored authorization information according to the requesting blockchain apparatus identifier" in the embodiment shown in FIG. 2, the method may further comprise performing validity verification for the block data request. A specific implementation mode of legality verification is the same as the implementation mode of verifying whether the authorization request is legal in step (b2) of the above embodiment. Reference may be made to the depictions of the above embodiment for details, which are not provided in detail any longer.

The cross-blockchain data access method in the present embodiment differs from the embodiment shown in FIG. 1 in that in the cross-blockchain data access method in the embodiment shown in FIG. 1, the technical solution of the present disclosure is described on the side of the requesting blockchain apparatus, whereas in the present embodiment, the technical solution of the present disclosure is described on the side of the authorizing blockchain apparatus. Their implementation principles are the same, and both sides may refer to each other.

According to the cross-blockchain data access method of the present embodiment, it is possible to receive a block data request sent by a requesting blockchain apparatus and carrying a requesting blockchain apparatus identifier and authorization information; obtain a corresponding locally-stored authorization information according to the requesting blockchain apparatus identifier; verify whether the corresponding locally-stored authorization information is matched with authorization information in the block data request; if matched, send block data corresponding to the block data request, to the requesting blockchain apparatus. According to the technical solution of the present embodiment, through an authorization mechanism, namely, the authorizing blockchain apparatus's authorization for the requesting blockchain apparatus, the requesting blockchain apparatus may access the block data of the authorizing blockchain apparatus according to the authorization information, thereby finally achieving cross-blockchain data access. The cross-blockchain data access according to the present embodiment does not require manual participation and exhibits a higher access efficiency.

Figure 3:
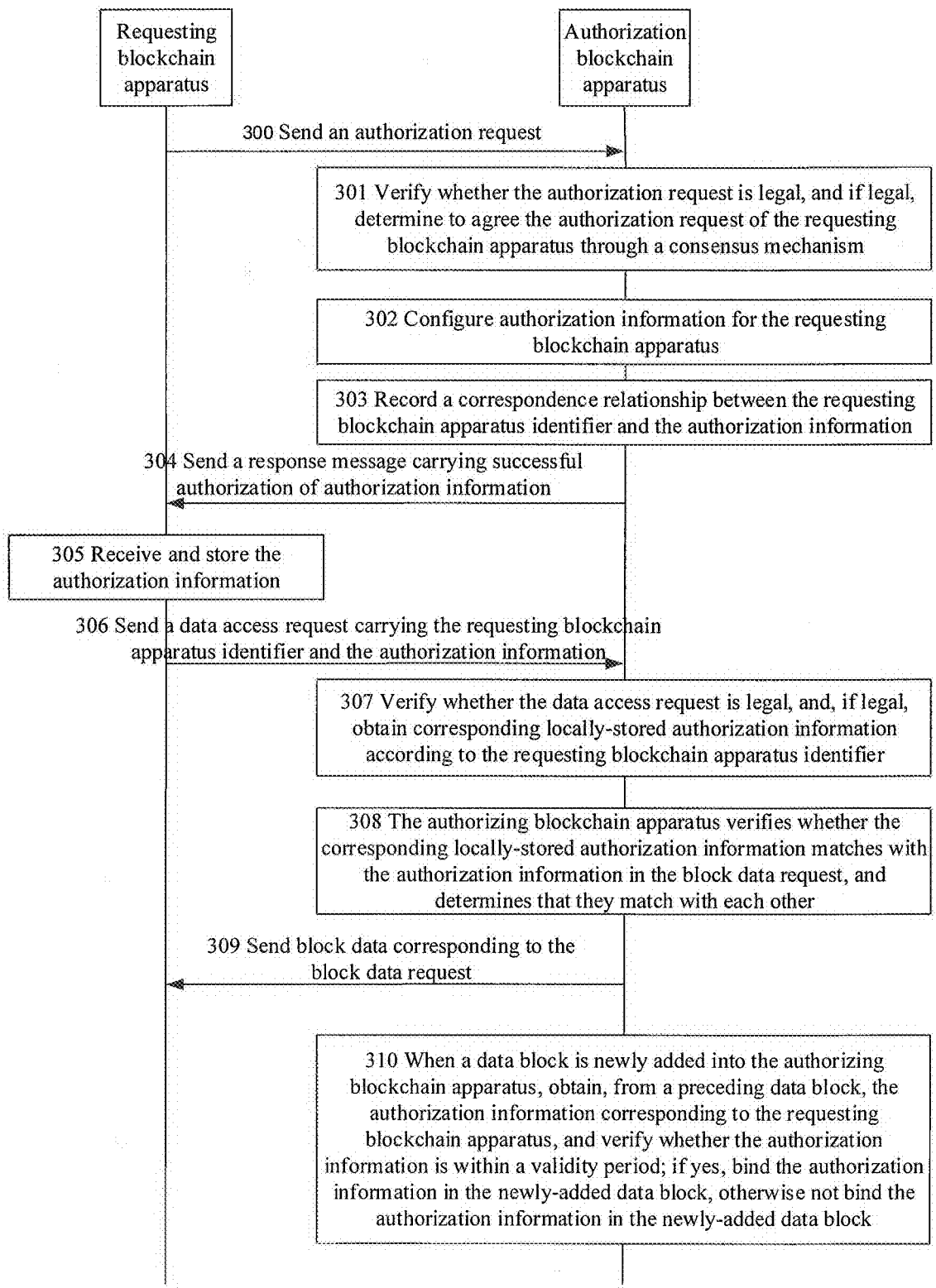
FIG. 3 is a signaling diagram of Embodiment 3 of a cross-blockchain data access method according to the present disclosure.

FIG. 3 is a signaling diagram of Embodiment 3 of a cross-blockchain data access method according to the present disclosure. According to the cross-blockchain data access method of the present embodiment, the technical solution of the present disclosure is described from perspective of signaling tendency on the basis of the technical solutions of embodiments shown in FIG. 1 and FIG. 2. As shown in FIG. 3, the cross-blockchain data access method of the present embodiment may specifically comprise the following steps:

300: the requesting blockchain apparatus sends an authorization request to the authorizing blockchain apparatus;

301: the authorizing blockchain apparatus verifies whether the authorization request is legal, and if legal, determines to agree the authorization request of the requesting blockchain apparatus through a consensus mechanism;

In the present embodiment, the technical solution of the present disclosure is described by taking determining to agree the authorization request of the requesting blockchain apparatus through a consensus mechanism as an example. In practical application, in the case of determining not to agree the authorization request of the requesting blockchain apparatus through a consensus mechanism, it is possible to directly return a response message of rejecting authorization.

302: the authorizing blockchain apparatus configures authorization information for the requesting blockchain apparatus;

303: the authorizing blockchain apparatus records a correspondence relationship between the requesting blockchain apparatus identifier and the authorization information;

Correspondingly, when a data block is newly added to the blockchain nodes of the authorizing blockchain apparatus, it is also possible to obtain, from a preceding block, the authorization information corresponding to the requesting blockchain apparatus, and store the authorization information, so that data access can also be supported subsequently.

304: the authorizing blockchain apparatus sends a response message carrying successful authorization of authorization information, to the requesting blockchain apparatus;

305: the requesting blockchain apparatus receives and stores the authorization information;

306: the requesting blockchain apparatus sends the authorizing blockchain apparatus a data access request carrying the requesting blockchain apparatus identifier and the authorization information;

307: the authorizing blockchain apparatus verifies whether the data access request is legal, and, if legal, obtains corresponding locally-stored authorization information according to the requesting blockchain apparatus identifier;

308: the authorizing blockchain apparatus verifies whether the corresponding locally-stored authorization information matches with the authorization information in the block data request, and determines that they match with each other.

In the present embodiment, an example is taken in which the corresponding locally-stored authorization information matches with the authorization information in the block data request. In practical application, if they do not match with each other, it is possible to directly return rejection of the block data request to the requesting blockchain apparatus.

309: the authorizing blockchain apparatus sends block data corresponding to the block data request to the requesting blockchain apparatus;

310: when a data block is newly added into the authorizing blockchain apparatus, it is also possible to obtain, from a preceding data block, the authorization information corresponding to the requesting blockchain apparatus, and verify whether the authorization information is within a validity period; if yes, bind the authorization information in the newly-added data block, otherwise not bind the authorization information in the newly-added data block.

Whether the authorization information is within the validity period is determined according to an authorization validity period of the authorization information. If the authorization validity period corresponds to a current moment and does not expire, the authorization information is still within the validity period, otherwise the authorization information is not within the validity period.

This step is described by taking the authorization information corresponding to the requesting blockchain apparatus as an example. In practical application, authorization information corresponding to any blockchain apparatus may be processed in a similar manner and will not be detailed any more here.

According to the cross-blockchain data access method of the present embodiment, with the above technical solution being employed, it is possible that, through an authorization mechanism, namely, the authorizing blockchain apparatus's authorization for the requesting blockchain apparatus, the requesting blockchain apparatus may access the block data of the authorizing blockchain apparatus according to the authorization information, thereby finally achieving cross-blockchain data access. The cross-blockchain data access according to the present embodiment does not require manual participation and exhibits a higher access efficiency.

The cross-blockchain data access method according to present disclosure is a cross-blockchain data sharing and right control method based on authorization, intrudes less into already-existing blockchains and is easy to implement. It is possible to flexibly authorize or de-authorize according to business needs, while achieving safe cross-blockchain data sharing. This solution is a good cross-blockchain technical solution, and meanwhile can be implemented by being directly applied to a current blockchain such as Ethereum or Hyperledger, and is of a very important practical significance.

Figure 4:
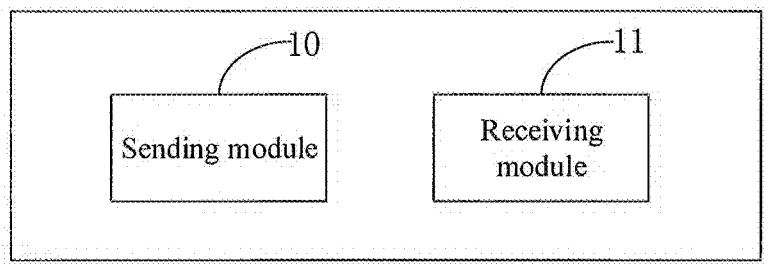
FIG. 4 is a structural diagram of Embodiment 1 of a blockchain apparatus according to the present disclosure.

FIG. 4 is a structural diagram of Embodiment 1 of a blockchain apparatus according to the present disclosure. As shown in FIG. 4, the blockchain apparatus according to the present embodiment may specifically comprise:

a sending module 10 configured to send an authorizing blockchain apparatus a block data request carrying a requesting blockchain apparatus identifier and authorization information, so that the authorizing blockchain apparatus verifies whether the authorization information corresponding to locally-stored requesting blockchain apparatus identifier is matched with the authorization information in the block data request;

a receiving module 11 configured to receive block data sent by the authorizing blockchain apparatus and corresponding to the block data request, the block data being sent after the authorizing blockchain apparatus verifies that the authorization information corresponding to locally-stored requesting blockchain apparatus identifier is matched with the authorization information in the block data request.

Further optionally, in the blockchain apparatus as shown in FIG. 4, the sending module 10 is further configured to send the authorizing blockchain apparatus an authorization request carrying the requesting blockchain apparatus identifier so that the authorizing blockchain apparatus, after verifying legality of the authorization request, determines whether to agree the authorization request of the authorizing blockchain apparatus;

the receiving module 11 is further configured to receive and store the authorization information sent by the authorizing blockchain apparatus, the authorization information is configured and sent for the requesting blockchain apparatus after the authorizing blockchain apparatus determines to agree the authorization request of the authorizing blockchain apparatus.

Further optionally, the authorization information comprises an authorization token and a validity period of authorization. The authorization token is a token character string after a private key of a blockchain node authorized by the authorizing blockchain apparatus performing authorization is encrypted.

Principles employed by the blockchain apparatus according to the present embodiment to implement the cross-blockchain data access using the above modules and the resultant technical effects are the same as those of the above-mentioned method embodiments. For particulars, please refer to the depictions of the aforesaid relevant method embodiments, and no detailed depictions will be presented here.

Figure 5:
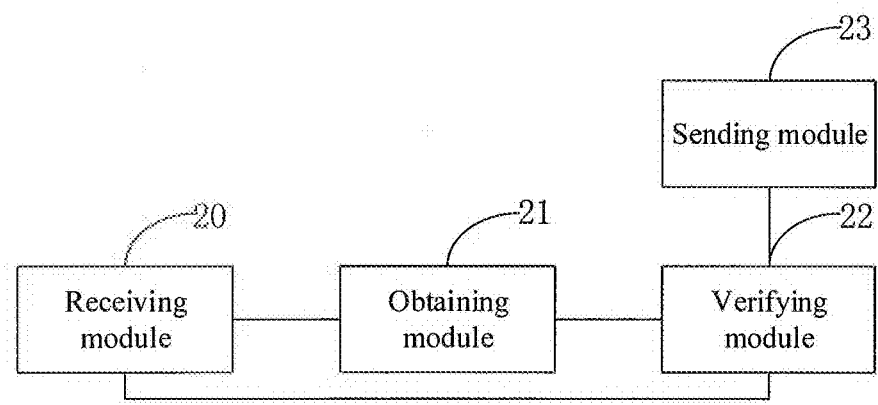
FIG. 5 is a structural diagram of Embodiment 2 of a blockchain apparatus according to the present disclosure.

FIG. 5 is a structural diagram of Embodiment 2 of a blockchain apparatus according to the present disclosure. As shown in FIG. 5, the blockchain apparatus according to the present embodiment may specifically comprise:

a receiving module 20 configured to receive a block data request sent by a requesting blockchain apparatus and carrying a requesting blockchain apparatus identifier and authorization information;

an obtaining module 21 configured to obtain a corresponding locally-stored authorization information according to the requesting blockchain apparatus identifier in the block data request received by the receiving module 20;

a verifying module 22 configured to verify whether the corresponding locally-stored authorization information obtained by the obtaining module 21 is matched with authorization information in the block data request received by the receiving module 20;

a sending module 23 configured to send block data corresponding to the block data request, to the requesting blockchain apparatus if the verifying module 22 verifies that the corresponding locally-stored authorization information is matched with authorization information.

Principles employed by the blockchain apparatus according to the present embodiment to implement the cross-blockchain data access using the above modules and the resultant technical effects are the same as those of the above-mentioned method embodiments. For particulars, please refer to the depictions of the aforesaid relevant method embodiments, and no detailed depictions will be presented here.

Figure 6:
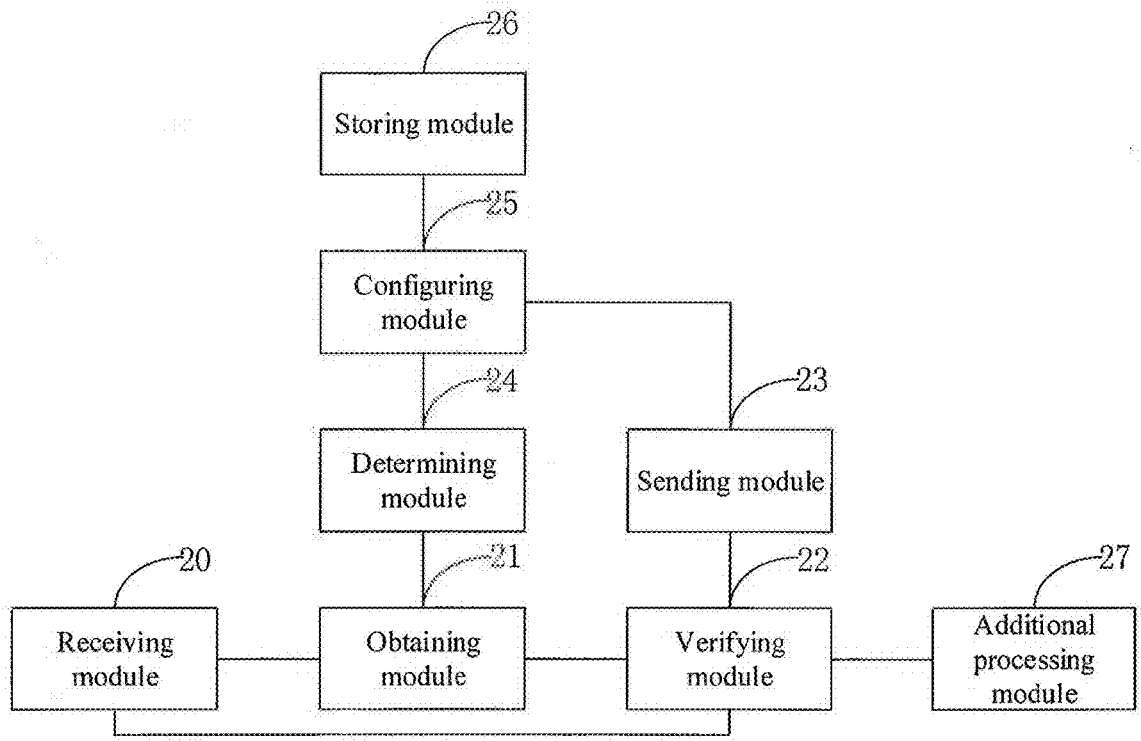
FIG. 6 is a structural diagram of Embodiment 3 of a blockchain apparatus according to the present disclosure.

FIG. 6 is a structural diagram of Embodiment 3 of a blockchain apparatus according to the present disclosure. As shown in FIG. 6, the blockchain apparatus of the present embodiment may further comprise the following technical solution on the basis of the technical solution of the embodiment shown in FIG. 5.

As shown in FIG. 6, the blockchain apparatus of the present embodiment further comprises a determining module 24.

The receiving module 20 is configured to receive an authorization request sent by the requesting blockchain apparatus and carrying the requesting blockchain apparatus identifier;

The verifying module 22 is further configured to verify whether the authorization request received by the receiving module 20 is legal;

The determining module 24 is configured to, if the verifying module 22 verifies that the authorization request is legal, determine to agree the authorization request of the requesting blockchain apparatus through a consensus mechanism.

Further optionally, as shown in FIG. 6, the blockchain apparatus in the present embodiment further comprise a configuring module 25 and a storing module 26;

the configuring module 25 is configured to configure authorization information for the requesting blockchain apparatus after the determining module 24 determines to agree authorization request of the requesting blockchain apparatus;

the storing module 26 is configured to store a correspondence relationship between the requesting blockchain apparatus identifier and the authorization information configured by the configuring module 25;

the sending module 23 is further configured to send the authorization information configured by the configuring module 25 to the requesting blockchain apparatus.

Further optionally, as shown in FIG. 6, the blockchain apparatus in the present embodiment further comprise a configuring module 25 specifically configured to:

regard a token character string obtained after encrypting a private key of a blockchain node authorized by performing authorization, as an authorization token;

set a corresponding authorization validity period.

Further optionally, in the blockchain apparatus in the present embodiment, the verifying module 22 is specifically configured to:

verify whether a format of the authorization request is correct;

verify whether the requesting blockchain apparatus identifier in the authorization request is legal:

verify whether the type of the requesting blockchain apparatus identifier in the authorization request is legal;

verify whether a signature of the authorization request is legal;

verify whether a protocol version corresponding to the authorization request is legal; and/or verify whether content of the authorization request is legal.

Further optionally, in the blockchain apparatus in the present embodiment, the determining module 24 is specifically configured to:

send an authorization proposal request to any target blockchain node, so that the target blockchain node sends an authorization proposal request carrying the requesting blockchain apparatus identifier to all other blockchain nodes, and all blockchain nodes perform consensus scoring for the requesting blockchain apparatus to obtain a final score of the requesting blockchain apparatus;

detect whether the final score is larger than a preset score threshold;

if yes, determine to agree the authorization request of the requesting blockchain apparatus.

Further optionally, as shown in FIG. 6, the blockchain apparatus in the present embodiment further comprises an additional processing module 27.

The verifying module 22 is specifically configured to, when a data block is newly added, verify whether the already-existing authorization information is within a validity period;

The additional processing module 27 is configured to add the authorization information corresponding to the requesting blockchain apparatus identifier to the newly-added data block if the verifying module 22 verifies that the already-existing authorization information is within the validity period.

Principles employed by the blockchain apparatus according to the present embodiment to implement the cross-blockchain data access using the above modules and the resultant technical effects are the same as those of the above-mentioned method embodiments. For particulars, please refer to the depictions of the aforesaid relevant method embodiments, and no detailed depictions will be presented here.

Figure 7:
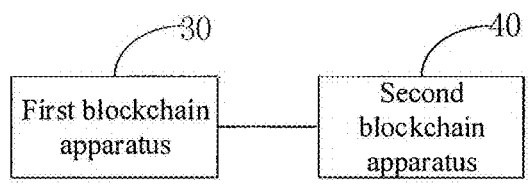
FIG. 7 is a structural diagram of an embodiment of a cross-blockchain data access system according to the present disclosure.

FIG. 7 is a structural diagram of an embodiment of a cross-blockchain data access system according to the present disclosure. As shown in FIG. 7, the cross-blockchain data access system according to the present embodiment comprises a first blockchain apparatus 30 and a second blockchain apparatus 40 which are communicatively coupled, the first blockchain apparatus 30 employs the blockchain apparatus shown in the above FIG. 3, and the second blockchain apparatus 40 correspondingly employs the blockchain apparatus as shown in above FIG. 4 or FIG. 5. On the contrary, the first blockchain apparatus 30 may also employ the blockchain apparatus as shown in above FIG. 4 or FIG. 5, and the second blockchain apparatus 40 correspondingly employs the blockchain apparatus as shown in above FIG. 3. Specifically, it is possible to employ the cross-blockchain data access method of embodiments shown in FIG. 1-FIG. 3 to achieve the cross-blockchain data access. For particulars, please refer to depictions of the above relevant embodiments.

Figure 8:
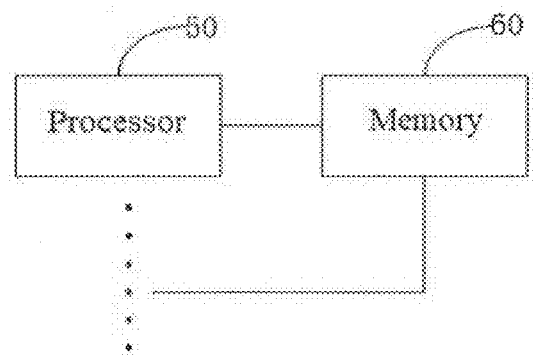
FIG. 8 is a block diagram of an embodiment of a computer device according to the present disclosure.

FIG. 8 is a block diagram of an embodiment of a computer device according to the present disclosure. As shown in FIG. 8, the computer device according to the present embodiment comprises: one or more processors 50, and a memory 60 for storing one or more programs; the one or more programs stored in the memory 60, when executed by said one or more processors 50, enable said one or more processors 50 to implement the cross-blockchain data access method of the embodiments shown in FIG. 1-FIG. 3. The embodiment shown in FIG. 8 takes an example in which a plurality of processors 50 are included. The computer device of the present embodiment may serve as a blockchain apparatus or an event bus apparatus, to implement the function of cross-blockchain data access of the above embodiment.

Figure 9:
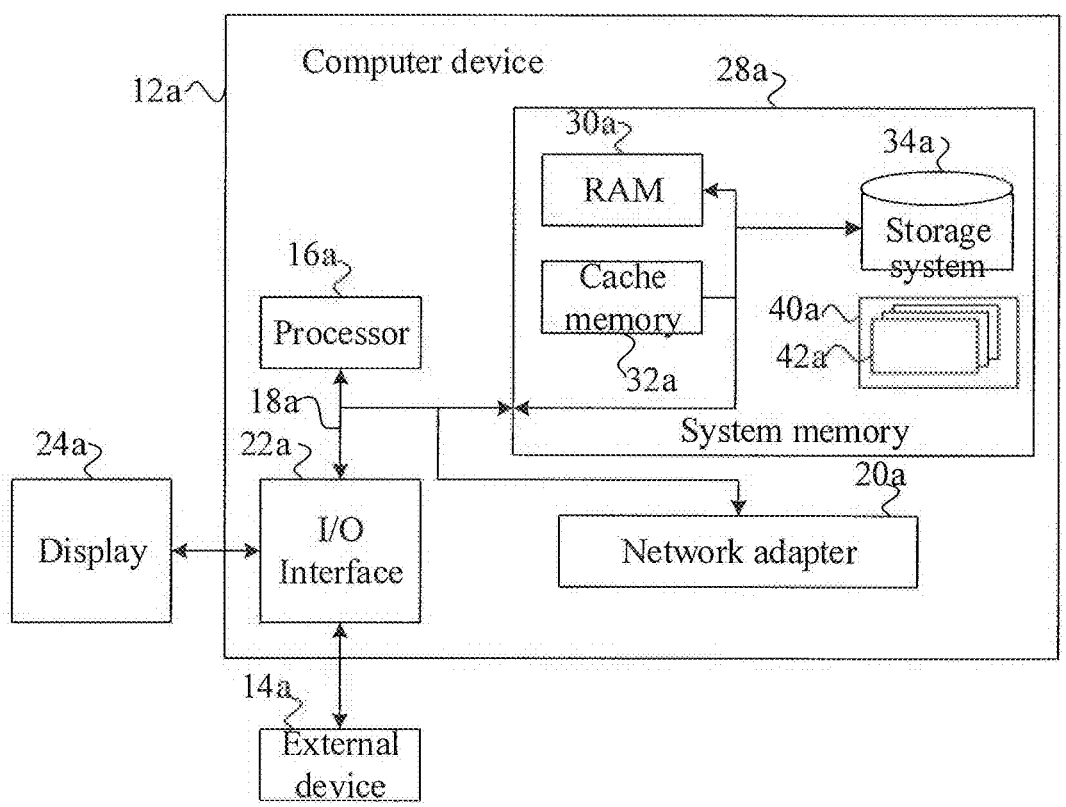
FIG. 9 is an example diagram of a computer device according to the present disclosure.

For example, FIG. 9 is an example diagram of a computer device according to an embodiment of the present disclosure. FIG. 9 shows a block diagram of an example computer device 12a adapted to implement an implementation mode of the present disclosure. The computer device 12a shown in FIG. 9 is only an example and should not bring about any limitation to the function and scope of use of the embodiments of the present disclosure.

As shown in FIG. 9, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and nonvolatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 9 and typically called a "hard drive"). Although not shown in FIG. 9, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 1-FIG. 6 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 1-FIG. 6 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 9, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the cross-blockchain data access method shown in the above embodiments.

The present disclosure further provides a computer readable medium on which a computer program is stored, the program, when executed by a processor, implementing the cross-blockchain data access method shown in the above embodiments.

The computer readable medium of the present embodiment may include RAM 30a, and/or cache memory 32a and/or a storage system 34a in the system memory 28a in the embodiment shown in FIG. 9.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences, or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk. Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A cross-blockchain data access method, wherein the method comprises:
receiving a block data request sent by a requesting blockchain apparatus and carrying a requesting blockchain apparatus identifier and authorization information;
obtaining a corresponding locally-stored authorization information according to the requesting blockchain apparatus identifier;
verifying whether the corresponding locally-stored authorization information is matched with the authorization information in the block data request;
sending block data corresponding to the block data request, to the requesting blockchain apparatus if the corresponding locally-stored authorization information is matched with the authorization information,
wherein before receiving a block data request sent by a requesting blockchain apparatus and carrying a requesting blockchain apparatus identifier and authorization information, the method further comprises:
receiving an authorization request sent by the requesting blockchain apparatus and carrying the requesting blockchain apparatus identifier;
verifying whether the authorization request is legal;
after determining that the authorization request is legal, determining to agree the authorization request of the requesting blockchain apparatus through a consensus mechanism,
wherein after determining to agree the authorization request of the requesting blockchain apparatus through a consensus mechanism, the method further comprises:
configuring the authorization information for the requesting blockchain apparatus;
storing a correspondence relationship between the requesting blockchain apparatus identifier and the authorization information;
sending the authorization information to the requesting blockchain apparatus, and
wherein the configuring the authorization information for the requesting blockchain apparatus specifically comprises:
regarding a token character string obtained after encrypting a private key of a blockchain node authorized by performing authorization, as an authorization token;
setting a corresponding authorization validity period.

2. The method according to claim 1, wherein the verifying whether the authorization request is legal specifically comprises anyone or more of the following:
verifying whether a format of the authorization request is correct;
verifying whether the requesting blockchain apparatus identifier in the authorization request is legal;
verifying whether the type of the requesting blockchain apparatus identifier in the authorization request is legal;
verifying whether a signature of the authorization request is legal;

verifying whether a protocol version corresponding to the authorization request is legal; and
verifying whether content of the authorization request is legal.

3. The method according to claim 1, wherein the determining to agree the authorization request of the requesting blockchain apparatus through a consensus mechanism specifically comprises:
sending an authorization proposal request to any target blockchain node, so that the target blockchain node sends an authorization proposal request carrying the requesting blockchain apparatus identifier to all other blockchain nodes, and all blockchain nodes perform consensus scoring for the requesting blockchain apparatus to obtain a final score of the requesting blockchain apparatus;
detecting whether the final score is larger than a presets core threshold;
if yes, determining to agree the authorization request of the requesting blockchain apparatus.

4. The method according to claim 1, wherein the method comprises:
when a data block is newly added, verifying whether the already-existing authorization information is within a validity period;
adding the authorization information corresponding to the requesting blockchain apparatus identifier to the newly-added data block if the already-existing authorization information is within the validity period.

5. A computer device, wherein the device comprises:
at least one processor; and
a memory communicatively connected with the at least one processor;
wherein the memory stores instructions executable by the at least one processor, and the instructions are executed by the at least one processor to enable the at least one processor to perform a cross-blockchain data access method, wherein the method comprises:
receiving a block data request sent by a requesting blockchain apparatus and carrying a requesting blockchain apparatus identifier and authorization information;
obtaining a corresponding locally-stored authorization information according to the requesting blockchain apparatus identifier;
verifying whether the corresponding locally-stored authorization information is matched with the authorization information in the block data request;
sending block data corresponding to the block data request to the requesting blockchain apparatus if the corresponding locally-stored authorization information is matched with the authorization information,
wherein before receiving a block data request sent by a requesting blockchain apparatus and carrying a requesting blockchain apparatus identifier and authorization information, the method further comprises:
receiving an authorization request sent by the requesting blockchain apparatus and carrying the requesting blockchain apparatus identifier;
verifying whether the authorization request is legal;
after determining that the authorization request is legal, determining to agree the authorization request of the requesting blockchain apparatus through a consensus mechanism,
wherein after determining to agree the authorization request of the requesting blockchain apparatus through a consensus mechanism, the method further comprises:
configuring the authorization information for the requesting blockchain apparatus;
storing a correspondence relationship between the requesting blockchain apparatus identifier and the authorization information;
sending the authorization information to the requesting blockchain apparatus, and
wherein the configuring the authorization information for the requesting blockchain apparatus specifically comprises:
regarding a token character string obtained after encrypting a private key of a blockchain node authorized by performing authorization, as an authorization token;
setting a corresponding authorization validity period.

6. A cross-blockchain data access system, wherein the system comprises: a first blockchain apparatus and a second blockchain apparatus which are communicatively coupled,
wherein the first blockchain apparatus comprises:
at least one first processor; and
a first memory communicatively connected with the at least one first processor;
wherein the first memory stores instructions executable by the at least one first processor, and the instructions are executed by the at least one first processor to enable the at least one first processor to perform a first cross-blockchain data access method, w herein the first cross-blockchain data access method comprises:
sending, to an authorizing blockchain apparatus, a block data request carrying a requesting blockchain apparatus identifier and authorization information, so that the authorizing blockchain apparatus verifies whether the authorization information corresponding to locally-stored requesting blockchain apparatus identifier is matched with the authorization information in the block data request;
receiving block data sent by the authorizing blockchain apparatus and corresponding to the block data request, the block data being sent after the authorizing blockchain apparatus verifies that the authorization information corresponding to locally-stored requesting blockchain apparatus identifier is matched with the authorization information in the block data request,
wherein the authorization information comprises an authorization token and a validity period of authorization, and the authorization token is a token character string after a private key of a blockchain node authorized by the authorizing blockchain apparatus performing authorization is encrypted,
and wherein the second blockchain apparatus comprises:
at least one second processor; and
a second memory communicatively connected with the at least one second processor;
wherein the second memory stores instructions executable by the at least one second processor, and the instructions are executed by the at least one second processor to enable the at least one second processor to perform a second cross-blockchain data access method, wherein the second cross-blockchain data access method comprises:
receiving the block data requests ent by the requesting blockchain apparatus and carrying the requesting blockchain apparatus identifier and authorization information;
obtaining the corresponding locally-stored authorization information according to the requesting blockchain apparatus identifier;

verifying whether the corresponding locally-stored authorization information is matched with the authorization information in the block data request;

sending the block data corresponding to the block data request, to the requesting blockchain apparatus if the corresponding locally-stored authorization information is matched with the authorization information, wherein before receiving a block data request sent by a requesting blockchain apparatus and carrying a requesting blockchain apparatus identifier and authorization information, the method further comprises:

receiving an authorization request sent by the requesting blockchain apparatus and carrying the requesting blockchain apparatus identifier;

verifying whether the authorization request is legal;

after determining that the authorization request is legal, determining to agree the authorization request of the requesting blockchain apparatus through a consensus mechanism, wherein after determining to agree the authorization request of the requesting blockchain apparatus through a consensus mechanism, the method further comprises:

configuring the authorization information for the requesting blockchain apparatus;

storing a correspondence relationship between the requesting blockchain apparatus identifier and the authorization information;

sending the authorization information to the requesting blockchain apparatus, and wherein the configuring the authorization information for the requesting blockchain apparatus specifically comprises:

regarding a token character string obtained after encrypting a private key of a blockchain node authorized by performing authorization, as an authorization token;

setting a corresponding authorization validity period.

7. A non-transitory computer readable medium on which a computer program is stored, wherein the program, when executed by a processor, implements a cross-blockchain data access method, wherein the method comprises:

receiving a block data request sent by a requesting blockchain apparatus and carrying a requesting blockchain apparatus identifier and authorization information;

obtaining a corresponding locally-stored authorization information according to the requesting blockchain apparatus identifier;

verifying whether the corresponding locally-stored authorization information is matched with the authorization information in the block data request;

sending block data corresponding to the block data request, to the requesting blockchain apparatus if the corresponding locally-stored authorization information is matched with the authorization information, wherein before receiving a block data request sent by a requesting blockchain apparatus and carrying a requesting blockchain apparatus identifier and authorization information, the method further comprises:

receiving an authorization request sent by the requesting blockchain apparatus and carrying the requesting blockchain apparatus identifier;

verifying whether the authorization request is legal;

after determining that the authorization request is legal, determining to agree the authorization request of the requesting blockchain apparatus through a consensus mechanism, wherein after determining to agree the authorization request of the requesting blockchain apparatus through a consensus mechanism, the method further comprises:

configuring the authorization information for the requesting blockchain apparatus;

storing a correspondence relationship between the requesting blockchain apparatus identifier and the authorization information;

sending the authorization information to the requesting blockchain apparatus, and wherein the configuring the authorization information for the requesting blockchain apparatus specifically comprises:

regarding a token character string obtained after encrypting a private key of a blockchain node authorized by performing authorization, as an authorization token;

setting a corresponding authorization validity period.

* * * * *